March 3, 1931. D. WENHAM 1,795,102
LAWN MOWER
Filed Feb. 21, 1929

Inventor:
Douglas Wenham
By
Pennie Davis Marvin & Edmonds
attorneys

Patented Mar. 3, 1931

1,795,102

UNITED STATES PATENT OFFICE

DOUGLAS WENHAM, OF HAMILTON, NEW ZEALAND, ASSIGNOR TO WENMUR BLADES LIMITED, OF HAMILTON, NEW ZEALAND, A COMPANY OF NEW ZEALAND

LAWN MOWER

Application filed February 21, 1929, Serial No. 341,579, and in New Zealand April 3, 1928.

This invention has been devised with the object of providing improvements in the ordinary type of lawn mower, by means of which there is provided an improved cutting edge for the cutter blade that may be removed from time to time as required and that has a resilient springy effect in its contact with the rotating knives of the machine, and by means of which also, the tension of the said cutter blade upon the rotating knives may be more readily adjusted than is possible with the present means provided for this purpose.

In fully describing the invention, reference will be made to the accompanying drawings, in which:—

Figure 1:
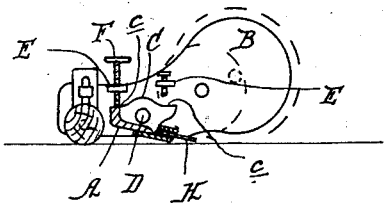
Figure 1 is a cross section through a lawn mower showing such portions of the machine with which this invention is concerned and looking to one end thereof.
Figure 2:
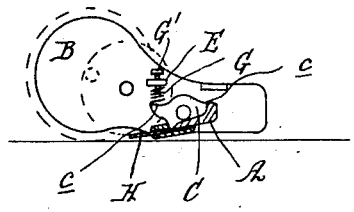
Figure 2 is a similar view but looking to the other end of the machine.
Figure 3:
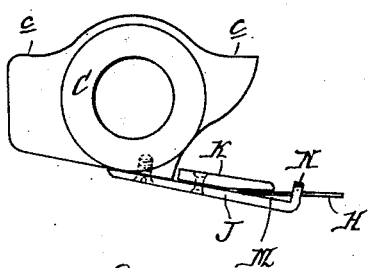
Figure 3 is an end elevation of the knife carrier and knife mounted thereon.
Figure 4:
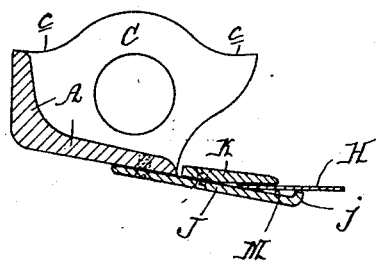
Figure 4 is a cross sectional elevation thereof.
Figure 5:
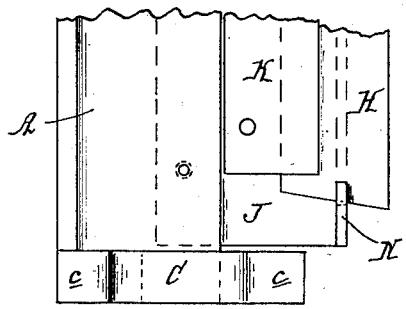
Figure 5 is a plan of one end of the knife carrier and knife.
Figure 6:
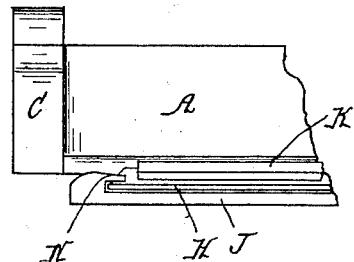
Figure 6 is a front elevation thereof.

The invention is concerned with the known construction of mower in which the knife blade is screwed, or otherwise secured, to a carrier bar A extending across between the side members B of the mower frame, and such carrier bar is attached to or formed in one with bracket members C—C at its ends, each of which brackets is mounted upon the adjacent frame side member by a trunnion pin D that allows of the carrier being tilted to cause the knife blade to be adjusted in relation to the rotating cutter knives. This adjustment hitherto has generally been effected by forming each bracket with extensions $c$ extending forwards and rearwards of the trunnion, and in providing set screws which pass down through lugs E on the frame member B and engage the tops of these bracket extensions $c$ so that by the relative adjustments of these set screws, the brackets are tilted and held in the adjusted positions. This manner of adjustment thus entails the manipulation of four set screws and is therefore slow in accomplishment.

In the present invention the adjustment is simplified and is effected by the manipulation of a single hand screw. Conveniently, this is accomplished by providing that the brackets C shall be tilted together, through their integral connection with the carrier bar A, and by the operation of a hand screw F passing down through a lug E and bearing upon the rear extension $c$ of one bracket, in opposition to a springy resilient force, in compression, bearing upon the forward extension $c$ of the other bracket, or of both brackets, if so desired. Such spring action is obtained by arranging a spring G between the forward lug E of the frame member B and the extension $c$ of the bracket, such spring being maintained in place by means of a set screw G' passing down through the said lug. Or alternatively, the hand screw may be arranged to pass down through a frame part and to bear upon a rearward lever extension of the carrier positioned at about midway in its length. The hand screw may have means combined therewith for locking it from turning.

Or, as a further alternative, the positions of the spring G or other resilient member and the hand screw F relatively to the back and front of the carrier may be reversed.

Instead of the hand screw being used, a wedge may be provided to bear between the bracket extension and the frame lug and by being moved in or out to provide for the adjustment desired. This wedge is controlled in its movements by a lever attached to the frame and having means for locking it in any adjusted position.

The knife in this invention is formed by a thin strip H of flexible steel and this is held upon the carrier bar by having its inner edge gripped within a holder bar attached to the said carrier bar so that the outer edge of the knife projects forwardly and is engaged by the rotating knives in the usual way. The carrier bar is set so that the knife is engaged by the rotating cutter knives with a close springy engagement and a resiliency in its action that will ensure of an effective cut being obtained and will also always maintain a sharp cutting edge.

The said holder bar is so formed as to provide for the back edge of the knife strip being gripped and for it being removed and replaced at will. This is given effect to by making the bar of two parts, a lower plate J that is affixed by screwing or otherwise, to the bottom of the carrier bar and has its forward edge projecting a distance forwardly of this bar, and an upper strip K that is secured to extend along the top surface of the plate J, as by being riveted thereto. This strip K is made of less width than the plate J and is so shaped at its forward portion as to form with the plate, the slot M extending along the full length of the bar and into which the knife back edge is fitted and gripped so that its forward edge overhangs the plate J in the manner before described.

The forward top edge of the plate J is preferably made with a slight ridge $j$ so that the knife H is given an upward set at its front edge that will increase its springiness in contact with the rotating cutter of the machine. The knife is maintained from curving upward by means of an overhanging lug N formed on one end of the plate J and beneath which that end of the knife passes. This lug is formed on the end with which the rotating cutter knives first engage in their operation.

In some cases the holder bar itself may be given a resilient cushioning effect in its relation to the cutter knives, by inserting between the rear edge of the plate J and the carrier bar, a strip of resilient material such as rubber.

I claim:—

1. In a lawn-mower having a knife-carrying bar extending between its side-frame members and pivoted thereto and having a knife-holder secured to extend along said bar, said holder having a slot extending along its front edge and a ledge projecting outside said slot, said ledge having means on its front edge for giving the knife an upward set thereat to thereby increase the springiness of said knife when contacting the rotary cutter.

2. In a lawn-mower having a knife-carrying bar extending between its side-frame members and pivoted thereto and having a knife-holder secured to extend along said bar, said holder having a slot extending along its front edge and a ledge projecting outside said slot, said ledge having means on its front edge for giving the knife an upward set thereat to thereby increase the springiness of said knife when contacting the rotary cutter, and said ledge having means at one end thereof for preventing the knife from curving upwardly.

3. In a lawn-mower having a knife-carrying bar extending between its side frame members and pivoted thereto and having a knife-holder secured to extend along said bar, said holder having a slot extending along its front edge and a ledge projecting out beneath said slot, said ledge having an upwardly turned flange on its front edge and an overhanging lug on one of its ends.

In testimony whereof, I affix my signature.

DOUGLAS WENHAM.